United States Patent [19]
Chang

[11] Patent Number: 5,329,397
[45] Date of Patent: Jul. 12, 1994

[54] ACOUSTO-OPTIC TUNABLE FILTER

[76] Inventor: I-Cheng Chang, 879 Payne Ct., Sunnyvale, Calif. 94087

[21] Appl. No.: 884,911

[22] Filed: Aug. 4, 1992

[51] Int. Cl.$^5$ ............................................. G02F 1/33
[52] U.S. Cl. .................... 359/308; 359/311; 359/313; 359/314; 359/285; 385/7
[58] Field of Search ............... 359/285, 287, 305, 308, 359/311, 313, 314; 385/7, 36

[56] References Cited

U.S. PATENT DOCUMENTS

| | | | |
|---|---|---|---|
| 3,679,288 | 7/1972 | Harris | 350/149 |
| 3,756,689 | 9/1973 | Hammond et al. | 359/308 |
| 3,944,335 | 3/1976 | Saito et al. | 350/161 |
| 3,953,107 | 4/1976 | Yano et al. | 350/149 |
| 3,982,817 | 9/1976 | Feichtner | 359/308 |
| 4,027,946 | 6/1977 | Tsai | 385/7 |
| 4,052,121 | 10/1977 | Chang | 350/149 |
| 4,602,342 | 7/1986 | Gottlieb et al. | 359/308 |
| 4,896,949 | 1/1990 | Melamed et al. | 359/285 |

FOREIGN PATENT DOCUMENTS 1406554  6/1988  U.S.S.R. ............... 359/308

OTHER PUBLICATIONS

Kusters, et al., "Optimum crystal orientation for acoustically tuned optical filters" J. of the Optical Society of America, vol. 64 Apr. 1974, pp. 434–440.

Chang; "Acousto-Optic Tunable Filters"; Acousto-Optic Signal Processing by Berg, et al. Marcel Dekker, New York, 1983, pp. 139–159.

Ohmachi, et al.; "Acoustic Wave Propagation in TeO$_2$ Single Crystal"; J. of the Acoustical Society of America, vol. 51, No. 1 (Pt 2) Jan. 1972 pp. 164–168.

Harris and Wallace "Acousto-optic Tunable Filters", JOSA 59 Jun. 1969 p. 744.

Chang "Noncollineer Acousto-optic filter with Large Angular Aperture" Applied Phys. Lett. 25, Oct. 15, 1974 p. 370.

Yano et al. "New Noncollinear Acousto-Optic Filter Using Birefringence in Paratellunite" Appl. Phys. Lett. 24, Mar. 15, 1974 p. 256.

Y. Ohmachi and J. Noda "LiNbO$_3$ TE-TM mode converter using collinear acousto-optic interaction" IEEE J. Quantum Electron QE-13 p. 43, 1977.

Primary Examiner—Loha Ben
Assistant Examiner—Evelyn A. Lester

[57] ABSTRACT

An electronically tunable optical filter utilizing noncollinear acousto-optic interaction in an acoustically anisotropic, optically birefringent crystal. The directions of optical and acoustic waves are chosen so that the optical ray is collinear with the group velocity of the acoustic wave. The collinear beam configuration provides increased spectral resolution and reduced drive power.

8 Claims, 2 Drawing Sheets

ACOUSTO-OPTIC TUNABLE FILTER

BACKGROUND OF THE INVENTION

1. Field of the Invention

This invention relates to the field of electronically tunable optical filters utilizing noncollinear acousto-optic interaction in a birefringent crystal.

2. Description of Prior Art

Electronically tunable optical filters have been constructed so that an incident light beam of a first polarization is diffracted by an acoustic wave in a birefringent crystal to shift from the first to a second polarization of the light beam for a selected bandpass of optical frequencies. The center wavelength of the passband of this type of filter is electronically tunable by changing the frequency of the acoustic wave within the crystal.

Two basic types of acousto-optic tunable filters (AOTFs) have been constructed: collinear and noncollinear. In the collinear filter, the incident and diffracted optical waves inside the birefringent crystal are collinear with the acoustic wave. The diffracted light beam at the selected passband is separated from the incident light beam by crossed polarizers. One significant feature of the collinear AOTF is that the narrow filter bandpass can be maintained for incident light having a distribution of incident light directions. This large angular aperture characteristic is important in optical systems applications where a large optical throughput is required. The collinear type of acousto-optic filter is disclosed in an article entitled "Acousto-Optic Tunable Filters," appearing on pages 744–747 in the June, 1969 issue of *The Journal of the Optical Society of America* (Vol. 59, No. 6), and in U.S. Pat. No. 3,679,288, entitled "Tunable Acousto-Optic Method and Apparatus."

In the noncollinear filter, the optical wave inside the birefringent crystal are noncollinear with the acoustic wave. The diffracted beam at the passband is selected from the incident light beam either by crossed polarizers or by spatial separation. One type of noncollinear AOTF was described in a paper entitled "Noncollinear acousto-optic filter," presented at the 1973 IEEE/OSA conference on laser engineering and applications and in U.S. Pat. Nos. 3,944,334, 3,944,335, and 3,953,107, all of which were entitled "acousto-optic filter." This type of noncollinear AOTF has a small angular aperture and must be restricted to a well-collimated light source. A second type of noncollinear AOTF is disclosed in an article entitled "Noncollinear Acousto-Optic Filter with Large Angular Aperture," appearing on pages 370–372 of the Oct. 15, 1974 issue of the *Applied Physics Letters* (Vol. 25), and in U.S. Pat. No. 4,052,121 entitled "Noncollinear Tunable Acousto-Optic Filter." In contrast to the first type, this type of noncollinear AOTF has the important feature of large angular aperture. The large angular aperture is due to the proper choices of interaction geometry wherein the tangents to the loci of the incident and diffracted light wave vectors are "parallel," a condition known as non-critical phase matching (NPM). The above two types of noncollinear AOTFs are referred to as the critical phase matching (CPM) and NPM types, respectively.

Due to its large angular aperture, the NPM type of AOTF has been most commonly used. However, the additional "parallel tangents" requirement also introduces practical fabrication difficulties, with the consequent higher costs and lower performance. The CPM type AOTF is suitable for applications involving collimated light sources, such as the wavelength division multiplexing (WDM) in fiberoptic communications network.

The two basic types of AOTF described above, the collinear and noncollinear, are distinguishable from the interaction geometry of the acoustic and optical wave vectors. In a collinear AOTF, the wave vectors of incident and diffracted light and the acoustic wavevector (i.e., phase velocity vector) are all substantially aligned along a principal axis of the birefringent crystal. In a noncollinear AOTF, the directions of all three wave vectors are different and are not along any principal crystal axis. The angle between the incident light and the acoustic wave directions are substantially greater than zero. Due to the different acousto-optic interaction geometry, the characteristics of collinear and noncollinear AOTFs are entirely different. For instance, $TeO_2$ is the most efficient material for noncollinear AOTFs, but is not applicable to collinear AOTFs since the relevant elasto-optical coefficient is zero. Collinear AOTFs rely on the use of crossed polarizers to separate the filtered light beam from the broadband light beam; while in a noncollinear AOTF, these light beams are separated spatially. Discussion of the two basic types of AOTF can be found, for instance, in a review paper entitled, "Acousto-Optic Tunable Filters", appearing on pages 139 to 159 in Acousto-Optic Signal Processing (N. Berg and J. Lee, ed.), Marcel Dekker, New York, 1983.

The characteristics of both types of AOTFs are dependent on the acoustic wave propagation in the medium. The acoustic phase velocity $\bar{V}_p$ is along the direction of the acoustic wave vector $\bar{K}_a$. In an acoustically isotropic medium the magnitudes of the phase velocities are equal for all directions of propagation. In this case the group velocity $\bar{V}_g$, which is along the direction of the acoustic beam or energy flow, is collinear with the phase velocity $\bar{V}_p$. On the other hand, in an acoustically anisotropic medium, the magnitudes of the phase velocities along different directions are not equal. As a result, the direction of the acoustic beam or group velocity $\bar{V}_g$ is in general different from that of the acoustic wave or phase velocity $\bar{V}_p$. For wave propagation in some acoustically anisotropic crystals, the angular deviation of the group velocity from the phase velocity, commonly referred to as the acoustic walkoff, can be quite large. For instance, in $TeO_2$ the slow shear acoustic wave propagating at 15° with the [110] axis exhibits an acoustic walkoff of 57.4 degrees. A detailed discussion of acoustic wave propagation in $TeO_2$ crystal is described in a paper by Y. Ohmachi et al appearing on pages 164–168 in Volume 51 of the Journal of the Acoustical Society of America, 1972.

The acoustic walkoff limits the total length of a collinear AOTF and results in performance degradation. An improved collinear AOTF with selected crystal orientation for compensating the acoustic anisotropy effect is described in U.S. Pat. No. 3,756,689 entitled, "Electronically Tunable Acousto-Optic Filter Having Selected Crystal Orientation".

Recent development of AOTFs has been focused on the integrated optic or guided wave structures. The integrated optical AOTF is described in an article by Y. Ohmachi and J. Noda, entitled "$LiNbO_3$ TE-TM mode converter using collinear acousto-optic interaction," IEEE J. Quantum Electron. Vol QE-13, pp. 43–46, 1977. The integrated optic AOTF provides the advantage of low drive power. To date, all integrated optic AOTF work has been restricted to $LiNbO_3$ using collinear acousto-optic interaction, i.e. the phase velocity of the optical and acoustic waves are collinear. Noncollinear AOTFs have not been explored in the integrated optic configuration primarily because of the difficulty of realizing long interaction length and low drive power. This major deficiency of the non-collinear AOTF may also be resolved by properly choosing a CPM-type configuration.

SUMMARY OF THE INVENTION

The present invention provides a preferred configuration in a noncollinear CPM type AOTF with the advantages of simpler construction, increased resolution, and reduced drive power. Specifically, the present invention describes a CPM type noncollinear AOTF using an acoustically anistropic crystal medium wherein the incident optical ray is collinear with the acoustic group velocity direction (i.e., energy flow direction). The present invention provides the design equation for the collinear beam AOTF.

Another object of the present invention to provide an alternate preferred configuration of the collinear beam AOTF.

It is also an object of the present invention is to provide a preferred configuration of the collinear beam AOTF that is polarization insensitive.

It is further the object of the present invention to provide a realization of an integrated optic AOTF using the collinear beam configuration.

DESCRIPTION OF THE PREFERRED EMBODIMENTS

Figure 1:
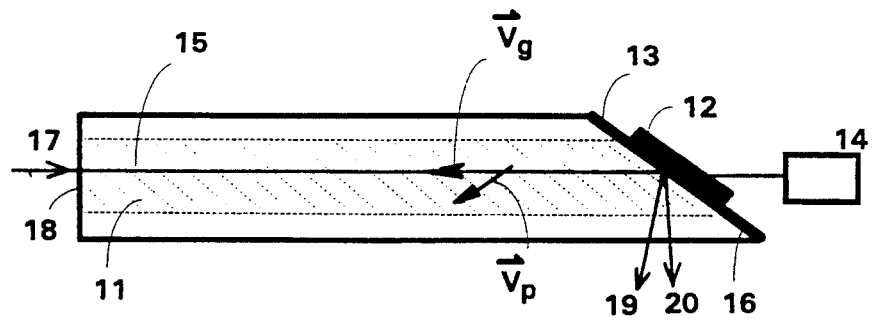
FIG. 1 is a schematic of the collinear beam AOTF configuration in accordance with the present invention.

Referring to FIG. 1, therein is shown, diagrammatically, a collinear beam AOTF in accordance with the present invention. The AOTF comprises a suitable acoustically anisotropic, optically birefringent elongated crystal 11. A piezo-electric transducer 12 is mounted in intimate contact with the crystal 11 on a predetermined surface 13 and is connected to a suitable radio frequency generator 14, such as a voltage controlled oscillator (VCO), the frequency and amplitude of which can be varied. The transducer launches an acoustic wave along the acoustic phase velocity $V_p$ which is normal to the transducer face 13. The crystal orientation of the acoustic wave is so chosen that the acoustic group velocity $V_g$ (i.e. the direction of acoustic energy flow) is along the long axis 15 of the crystal 11. The crystal face 13 in contact with the transducer 12 is provided with an internal mirror 16 with a high reflection coating. An incident polarized optical beam 17, which may be either a broadband incoherent light or a number of laser beams with different wavelengths, enters the crystal 11 from the end surface 18 of the elongated crystal 11, propagates along the axis 15 and is thereby collinear with the group velocity $V_g$ of the acoustic wave. Part of the incident beam at the selected wavelength is diffracted into the orthogonal polarization. The diffracted beam is reflected through the internal mirror 16 and exits the crystal 11 as output beam 19 and is spatially separated from the reflected broadband beam 20.

The selection of the interaction geometry (i.e. the directions of the optical and acoustic wavevectors) of the collinear beam AOTF can be determined from an analysis of the acousto-optic interaction in a birefringent crystal with the imposed requirement that the directions of the interacting acoustic and incident optical beams are collinear. The incident beam can be either ordinarily polarized (o-ray) or extra-ordinarily polarized (e-ray). To minimize wavelength dispersion an ordinary polarization is chosen for the incident optical beam. When the momentum matching condition is satisfied, an extra-ordinarily polarized diffracted optical beam at the passband wavelength will be generated in the crystal. The diffracted narrowband optical beams coupled out of the prism surface may be selected using polarizers or spatial separations.

An analysis of the collinear beam AOTF is derived as follows. It is assumed that the acoustic waves and optical chief rays lie in the same azimuth plane. The directions of the optical and acoustic waves are related by the collinearity requirement, i.e.

$$\theta_g = \theta_o \qquad (1)$$

where $\theta_o$ and $\theta_g$ are the polar angles of the ordinarily polarized ray (o-ray) and the acoustic group velocity, respectively. In a trigonal crystal or a tetragonal crystal the acoustic wave direction is given by:

$$\tan \theta_a = (C_{14} - C_{44} \tan \theta_g)/(C_{14} \tan \theta_g - C_{66}) \qquad (2)$$

At the center wavelength of the filter passband, exact momentum matching condition is satisfied, $$n_o \cos \theta_o + n_a \cos \theta_a = n_d \cos \theta_e \qquad (3)$$

$$n_o \sin \theta_o + n_a \sin \theta_a = n_d \sin \theta_e \qquad (4)$$

where $n_a = \lambda_o f_a / V$, $\lambda_o$ is the optical wavelength, $n_o$ is the ordinary refractive index, $f_a$ and $V$ are the frequency and velocity of the acoustic wave, $\theta_e$ is the polar angle of the diffracted optical wave, and $n_d$ is the corresponding index of refraction. For a uniaxial crystal, $n_d$ is given by $$n_d = n_o(1 - 2\delta \sin^2\theta_e)^{-1/2} \qquad (5)$$

where $\delta = (1 - n_o^2/n_e^2)/2$, $n_e$ is the refractive index of the extra-ordinarily wave polarized along the optic c-axis of the uniaxial crystal.

Substituting equations 3 and 4 into equation 5 and eliminating $\theta_e$, one obtains the following quadratic equation for $n_a$:

$$An_a^2 + 2Bn_o n_a - Cn_o^2 = 0 \qquad (6)$$

where $A=1-2\delta\sin^2\theta_a$, $B=\cos(\theta_o-\theta_a)-2\delta\sin\theta_a$, and $C=2\delta\sin^2\theta_o$. Solving equation 6 to get the frequency of the low mode acoustic wave:

$$f_a = \frac{n_o V(\theta_a)}{\lambda_o} (-B + \sqrt{B^2 + AC})/A \qquad (7)$$

For small birefringence $\Delta n = n_e - n_o$, equation 7 yields the approximate solution:

$$f_a = V_a \Delta n \sin^2\theta_o/(\lambda_o \cos(\theta_o-\theta_a)) \qquad (8)$$

Equations 1, 2, and 7 provide the design equations for the collinear beam AOTF using an o-ray input.

The analysis of the collinear beam AOTF presented above assumes an o-ray input. A similar analysis for an e-ray input is derived below. The collinearity of e-ray and the acoustic group velocity $V_g$ implies $$\tan\theta_g = (n_o^2/n_e^2) \tan\theta_e \qquad (9)$$

Since $n_e$ and $n_o$ are wavelength dependent, so is the acoustic group velocity direction $\theta_g$. The arrangement using an e-ray input is thus less desirable. The tuning relation, i.e. the acoustic frequency, $f_a$ is related to the passband wavelength $\lambda_o$ by $$f_a = \frac{Vn_e}{\lambda_o} (\cos(\theta_o - \theta_a) - \sqrt{\cos^2(\theta_o - \theta_a) - 2\delta\sin^2\theta_e}) \qquad (10)$$

Figure 2:
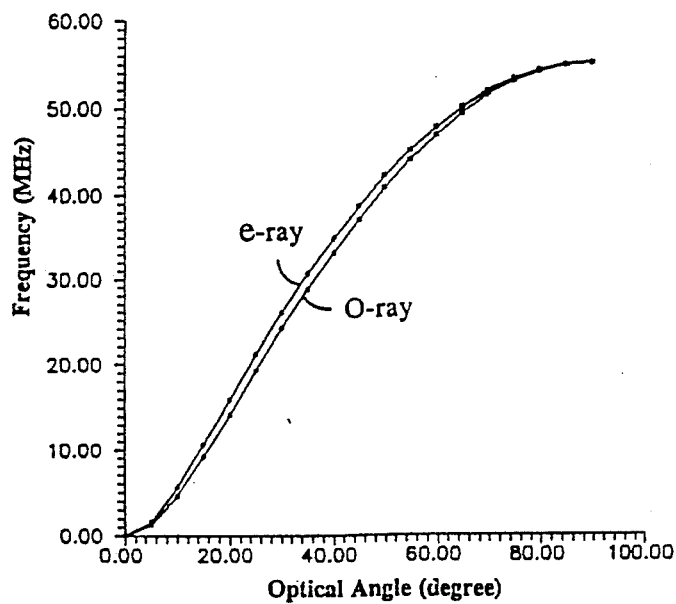
FIG. 2 is a plot of the acoustic frequency as a function of optical angle for a collinear beam $TeO_2$ AOTF operated at 1550 nanometers.

Equations 7 and 10 give the exact solutions for the driving acoustic frequency of the collinear beam AOTF for the o-ray and e-ray, respectively. For example, consider the design of a collinear beam TeO$_2$ AOTF. FIG. 2 plots the acoustic frequency as a function of the optical angle (ray direction) for a collinear beam TeO$_2$ AOTF operated at 1550 nm. Both the o-ray and the e-ray input cases are shown. Notice that the acoustic frequency for the o-ray type is slightly less than that for the e-ray type.

The approximate solution (equation 8) can also be derived from the momentum mismatch $\Delta k$ of optical and acoustic wave vectors:

$$\Delta k/2\pi = (\Delta n/\lambda_o)\sin^2\theta_o - (f_a/V)\cos(\theta_o-\theta_a) \qquad (11)$$

At the center wavelength the momentum-matching condition is satisfied, i.e. $\Delta k=0$. Again one obtains equation 8 for determining the acoustic frequency.

The spectral and angular bandwidths of the AOTF are determined from the phase mismatch $\Delta\phi = \Delta kL$, where L is the interaction length. From equation 11, the phase mismatch can be expressed as a function of wavelength and angular deviations from the chief ray $\alpha$, $$\Delta\phi = 2\pi L(\sin^2\theta_o/\lambda_o)[-b(\lambda-\lambda_o)/\lambda_o + (F\Delta n)\alpha] \qquad (12)$$

where b is the dispersive constant and $F=2\cot\theta_o+\tan(\theta_o-\theta_a)$. Letting $\Delta\phi=\pi$, the full width at half maximum (FWHM) is $$\Delta\lambda = \lambda_o^2/(bL\sin^2\theta_o) \qquad (13)$$

and the external angular aperture of the filter is:ps $$\Delta\theta = (n_o b/F\Delta n) \cdot \Delta\lambda/\lambda_o \qquad (14)$$

The angular aperture of the collinear beam AOTF is linearly proportional to the spectral bandwidth, and is therefore much smaller than that of the NPM type AOTFs. For narrowband filters the angular aperture is typically about a few milliradians.

The diffracted light is spatially separated from the incident light. The angular separation is:

$$\beta = \Delta n \sin^2\theta_o \tan(\theta_o-\theta_a) \qquad (15)$$

Figure 3:
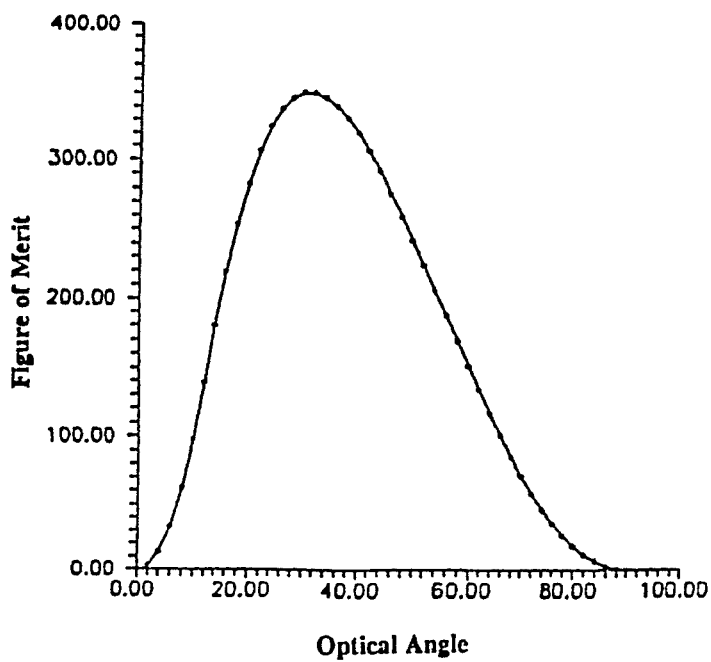
FIG. 3 is a plot of the acousto-optic figure of merit $M_2$ for a collinear beam $TeO_2$ AOTF as a function of the optical angle.

The drive power to achieve 100 percent diffraction efficiency is given by:

$$P_a = \lambda_o^2 S/(2M_2 L^2) \qquad (16)$$

where S is the acoustic beam size and $M_2$ is the acousto-optic figure of merit. FIG. 3 plots $M_2$ (relative to focused silica) of a collinear beam TeO$_2$ AOTF as a function of optical angle.

The most significant feature of the collinear beam AOTF is that it realizes an extended interaction length and thus the advantages of narrow passband and low drive power. Consider the design of a collinear beam TeO$_2$ AOTF. Assume the following choice of parameter values: $\theta_o=30°$, H (transducer size)=2 mm, and L=3 cm. The calculated performance of the collinear AOTF is given in table 1. For comparison the result of a large angular aperture NPM-type AOTF is also shown.

TABLE 1

Comparison of Collinear Beam and Non-critical Phase Matching (NPM) TeO$_2$ AOTF
($\lambda_o = 1550$ nm, $\theta_o = 30°$, L = 3 cm, H = 2 mm)

| Type | Collinear Beam | NPM |
|---|---|---|
| Acoustic angle (Deg.) | 81.6 | 103.8 |
| Acoustic frequency (MHz) | 24.3 | 64.1 |
| Passband FWHM (nm) | 2.3 | 2.1 |
| Angular separation (Deg.) | 2.5 | 7 |
| Angular aperture (mrad) | 1.6 | 75 |
| Acoustic power (mW) | 10 | 300 |
| Transducer width (mW) | 2 | 42 |

Notice that from Table 1 the angular aperture of the collinear beam AOTF is significantly smaller than that of the NPM type. The input beam must be collimated to less than 1.6 milliradians. However, for the same spectral bandpass the collinear beam AOTF has two important advantages. First, the drive power is much lower (by a factor of 30 in this case). Second, the device size is considerably smaller. The transducer size is twenty times smaller. The overall size of the collinear beam AOTF is at least 6 times smaller than that of the NPM-type AOTF.

Figure 4:
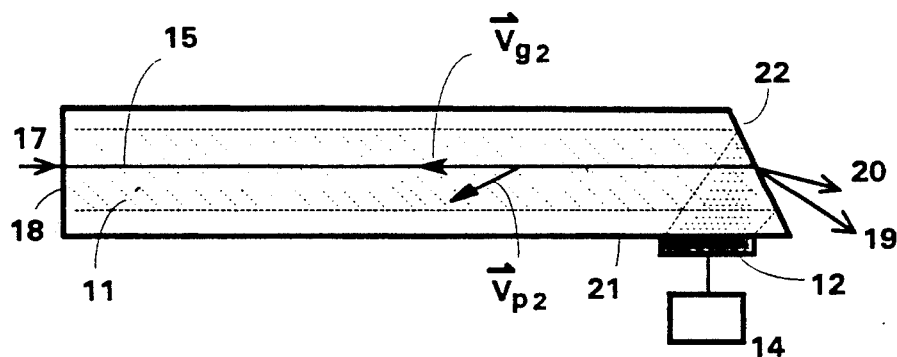
FIG. 4 is a schematic of an alternative embodiment of the collinear beam AOTF in accordance with the present invention.

Instead of the reflective configuration, a transmissive configuration is often preferred. Referring to FIG. 4, therein is shown the schematic of an alternative embodiment of collinear beam AOTF using a transmissive configuration. The AOTF comprises a suitable acoustically anisotropic optical birefringent crystal 11 with the axis 15 chosen along a predetermined crystalline orientation. A piezoelectric transducer 12 is mounted in intimate contact with the crystal 11 on the side surface 21 and is connected to a suitable radio frequency generator 14, such as a voltage controlled oscillator (VCO), the frequency and amplitude of which can be varied. The transducer launches a first acoustic wave along the acoustic phase velocity $V_{p1}$ which is normal to the transducer face 21. The energy of the acoustic wave moves along the acoustic group velocity $V_{g1}$, the direction of which is in general different than that of acoustic phase velocity. The first acoustic beam is reflected from the output optical face 22 and converts into a second acoustic wave with phase velocity $V_{p2}$ and group velocity $V_{g2}$. The orientation of the optical face 22 is properly chosen so that the group velocity of the second acoustic wave $V_{g2}$ is along the axis 15 of the elongated birefringent crystal 11. An incident polarized optical beam 17 enters the input optical face 18 of the birefringent crystal 11 and propagates along the axis 15 and is thereby collinear with the acoustic group velocity $V_{g2}$. Part of the incident beam at the selected passband wavelength is diffracted into the orthogonal polarization and transmits out of the optical face 22 of the birefringent crystal 11 as the filtered output beam 19. The broadband undiffracted beam 20 also exits out of the optical face and is spatially separated from the filtered beam 19.

Figure 5:
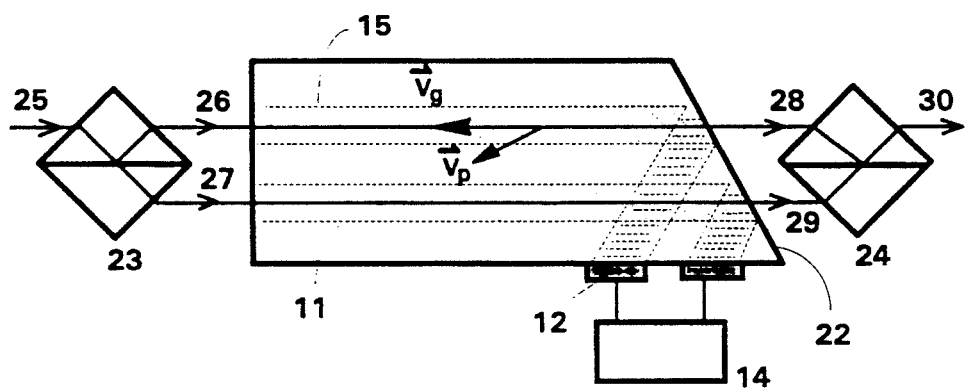
FIG. 5 is a schematic of another embodiment of the collinear beam AOTF in accordance with the present invention.

For many applications it is also desirable to have an AOTF that is insensitive to the input polarization. Referring to FIG. 5, therein is shown, diagrammatically, a polarization independent collinear beam AOTF in accordance with the present invention. The AOTF is comprised of a polarizing beamsplitter 23, a dual channel AOTF, made of an acoustically anisotropic, optically birefringent crystal, and a polarizing beam combiner 24. A pair of piezoelectric transducers 12 are mounted in intimate contact with the crystal 11 on the side face and are connected to a suitable radio frequency source 14, which may be two separately tuned voltage controlled oscillators (VCOs). The orientation of the output optical face 22 is properly chosen so that the reflected acoustic wave propagates with a group velocity $V_g$ along the axis 15 of the birefringent crystal 11. An incident unpolarized optical beam 25 is split by the input polarizer 23 into two separate beams of orthogonal polarizations, an a-ray 26 and an e-ray 27. Both rays are substantially collinear with the group velocity of the acoustic wave $V_g$ and are diffracted at the selected passband wavelength and transmitted out of the output optical face 22 as the filtered e-ray 28 and o-ray 29. The two beams are recombined by the polarizing beam combiner 24 into the filtered beam 30.

It is shown in FIG. 2 that the driving acoustic frequencies for o-ray and e-ray inputs are slightly different. To simultaneously satisfy the collinear beam requirement for both o-and e-rays, the two transducers may be independently driven by two separate VCOs. An alternative choice is to select an acoustic group velocity direction that lies inbetween the directions o-ray and e-ray for the same optical wavefront so a single frequency VCO can be used.

Figure 6:
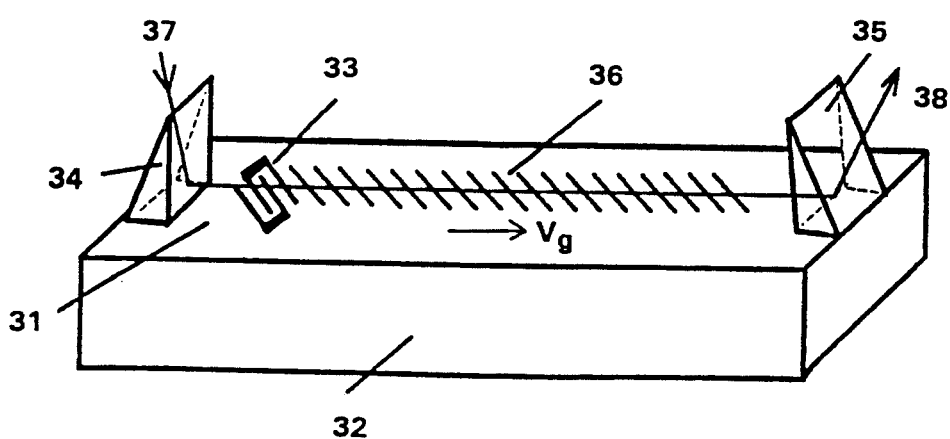
FIG. 6 is a schematic of the integrated optic collinear beam AOTF in accordance with the present invention.

The above preferred embodiments of the collinear beam AOTF are applicable to bulk optic devices. Another promising approach for further lowering the drive power is the integrated optic implementation. Referring to FIG. 6, therein is shown the schematic of an integrated AOTF using the collinear beam interaction between guided optic waves and surface acoustic waves (SAW). The integrated optic AOTF is comprised of an optical waveguide 31, made of a birefringent crystal substrate 32 such as LiNbO$_3$, an interdigital transducer (IDT) 33 deposited on the substrate 32 and connected to a radio frequency generator, an input prism coupler 34, and an output prism coupler 35. The IDT 33 launches a SAW 36 with a group velocity $\bar{V}_g$ along a predetermined axis of the birefringent crystal substrate 32. An incident polarized optical beam 37 is coupled into the waveguide 31 by the input prism coupler 34, propagates collinearly with the SAW group velocity $\bar{V}_g$. Part of the incident beam at the selected wavelength is diffracted into the orthogonal polarization. The diffracted beam is coupled out of the substrate 32 by the output prism coupler 36 and exists as the filtered output beam 38.

A number of birefringent crystal materials are promising for use as interaction medium for the collinear beam AOTF. Among these materials, TeO$_2$, Tl$_3$AsSe$_3$, and Hg$_2$Cl$_2$ are attractive due to their large acousto-optic figure of merit; LiNbO$_3$ and $\alpha$-SiO$_2$ are suitable for realizing the collinear beam AOTF in the integrated optic structure.

What is claimed is:

1. An acousto-optic tunable filter for diffracting incident light from a first polarization to a second polarization within a passband of optical wavelength, said filter comprising an acoustically anisotropic optically birefringent crystal, means for passing the incident light beam through said crystal along a selected axis, means for exciting an acoustic wave in said crystal comprising an acoustical transducer bonded to a selected surface of said crystal, means for directing the acoustic wave so that the phase velocity of the acoustic wave is noncollinear with the incident light and the group velocity of the acoustic wave is substantially collinear with the incident light, means for varying the frequency of the acoustic wave to select the center wavelength of the optical passband, means for coupling out the diffracted light comprising an internal mirror coated on the back surface of said acoustical transducer and means for separating the diffracted light from the incident light.

2. An acousto-optic tunable filter for diffracting incident light from a first polarization to a second polarization within a passband of optical wavelength, said filter comprising an acoustically anisotropic optically birefringent crystal, means for passing the incident light beam through said crystal along a selected axis, means for exciting a first acoustic wave in said crystal, means for directing the first acoustic wave onto an internal acoustic reflection surface of said crystal to generate a second acoustic wave and selecting the orientation of said internal reflection surface to direct the group velocity of the second acoustic wave to be along said selected axis of said crystal so that the phase velocity of the acoustic wave is noncollinear with the incident light and the group velocity of the acoustic wave is substantially collinear with the incident light, means for varying the frequency of the acoustic wave to select the center wavelength of the optical passband, and means for coupling out and separating the diffracted light from the incident light.

3. An acousto-optic tunable filter according to claim 1 or 2 and including means for making said filter insensitive to the polarization of the incident light comprising an input polarizing beamsplitter for separating the incident unpolarized light beam into two orthogonally polarized light beams, acoustical transducers to generate two separate acoustic beams for diffracting the separated polarized light beams, and an output polarizing beam combiner for recombining the two diffracted polarized light beams.

4. An acousto-optic tunable filter according to claim 1 or 2 wherein said birefringent crystal is Tellurite Oxide (TeO$_2$).

5. An acousto-optic tunable filter according to claim 1 or 2 wherein said birefringent crystal is Tl$_3$AsSe$_3$.

6. An acousto-optic tunable filter according to claim 1 or 2 wherein said birefringent crystal is Hg$_2$Cl$_2$.

7. An integrated acousto-optic tunable filter comprising an optical waveguide formed on the surface of an acoustically anisotropic, optically birefringent crystal substrate, an input prism coupler for coupling an incident light into said waveguide to excite an optical guided wave traveling along a selected axis of said crystal substrate, an interdigital transducer for exciting a surface acoustic wave in said crystal, means for directing the surface acoustic wave so that the phase velocity of the surface acoustic wave is noncollinear with the optical guided wave and the group velocity of the surface acoustic wave is substantially collinear with the optical guided wave, means for varying the frequency of the surface acoustic wave to selectively diffract the optical guided wave at a predetermined optical wavelength, and an output prism coupler for coupling out the diffracted optical guided wave.

8. An integrated acousto-optic tunable filter according to claim 7 wherein said birefringent crystal is substrate $LiNbO_3$.

* * * * *